(No Model.)
W. GARRETT.
MACHINE FOR AERATING MILK.
No. 458,895.  Patented Sept. 1, 1891.
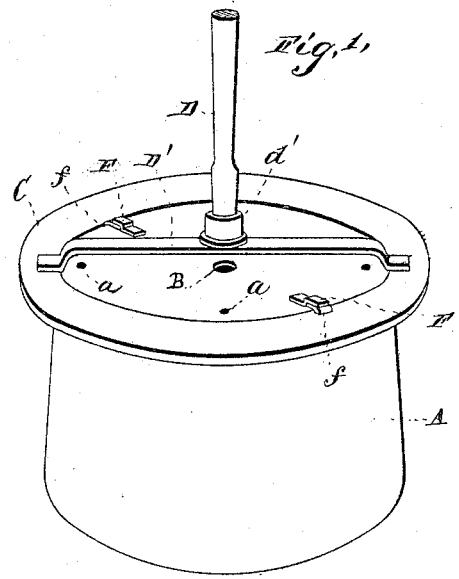
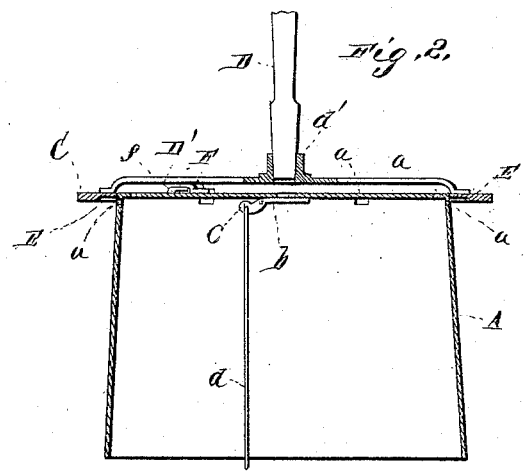
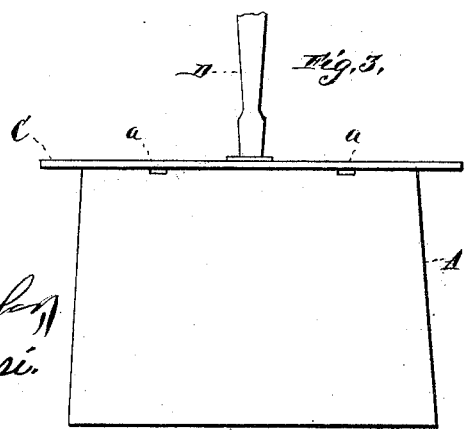
WITNESSES:
INVENTOR
W<sup>m</sup> Garrett
BY E. W. Anderson
his ATTORNEY.

UNITED STATES PATENT OFFICE.

WILLIAM GARRETT, OF TWEED, CANADA.

MACHINE FOR AERATING MILK.

SPECIFICATION forming part of Letters Patent No. 458,895, dated September 1, 1891.

Application filed February 13, 1891. Serial No. 381,358. (No model.) Patented in Canada October 22, 1890, No. 35,264.

*To all whom it may concern:*

Be it known that I, WILLIAM GARRETT, a citizen of Canada, and a resident of Tweed, in the county of Hastings and Province of Ontario, have invented certain new and useful Improvements in Machines for Aerating Milk, (for which I have received Letters Patent in Canada, dated October 22, 1890, No. 35,264;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view. Fig. 2 is a vertical section. Fig. 3 is a side view.

The invention relates to certain new and useful improvements in devices for cooling and aerating milk, water, and other liquids; and it consists in the construction and arrangement of parts hereinafter fully described.

In the accompanying drawings, illustrating the invention, the letter A designates an air reservoir or vessel of suitable material. (Shown as of cylindrical form, though any other suitable shape may be employed.) The under side of this receptacle is open, and the top closed, the whole being similar in form to an inverted pail. This reservoir may be provided with one or more suitable openings or apertures $a$, placed in the side or top, or in both, and are for the purpose of permitting the escape of air from the reservoir or vessel when it is submerged in any liquid. A larger opening B is also provided in the top for the purpose of admitting the air more freely when the reservoir or vessel is being raised above the surface of the liquid to overcome vacuum. This opening is provided with a valve $b$ on the under side to permit the ingress of air when the vessel is being raised. This valve is provided with a counterbalancing device $c$ for the purpose of closing it and preventing the escape of air until the receptacle sinks to the bottom. By means of a perpendicular rod $d$, connected to the counterbalanced end of the valve $b$, the said valve will be opened when the device presses upon the bottom of the receptacle containing the milk or other liquid, allowing air to escape by port B only.

C is a metal ring incasing or surrounding the top of the vessel or reservoir A, to which it may be permanently or detachably secured. This ring is for the purpose of attaching a handle D to a socket $d'$ at the center of its cross or bridge piece D', and also serves to weight the vessel to enable it to overcome the buoyancy of the volume of air therein when being submerged. This bridge-piece D' and its socket $d'$ may be dispensed with and one or more handles be attached to the top or sides of the vessel or in any other desirable way. On the under side of the ring C notches E E are provided opposite the air-vents $a$ when the said vents are made in the sides of the vessel near the top to provide for the free escape of air.

F F are small irons or clips on the top of the vessel for the lugs $ff$ on the inner edge of the ring C, whereby the ring is secured in place.

In the operation of this device it is placed in the can, barrel, or cistern, or other receptacle containing the milk or other liquid to be aerated or cooled, with its open end down and alternately submerged and withdrawn from said liquid. The depth of the liquid should be greater than the height of the air-reservoir A, so that said reservoir A will be entirely submerged in the liquid. The air will be confined in said reservoir and will be permitted to escape gradually through the air vents or holes at the top, passing up through the milk. As the air-reservoir reaches the bottom of the receptacle containing the milk the valve $b$ will be opened by its rod $d$ coming in contact with the bottom of the receptacle, thus permitting the escape of a larger quantity of air through the larger opening B. Were this opening not normally closed by the valve, too much air would escape therethrough before the aerator was sufficiently submerged. When the air has escaped from the aerator, it is raised and allowed to fill and then again submerged, and this operation is repeated as long as is necessary or may be desired. By this alternative submerging and refilling of the air-reservoir the liquid becomes thoroughly aerated, and after sufficient time will be brought to the temperature of the atmosphere and rendered more or less free from animal or other effluvium.

In addition to simply immerging the device may be operated by tilting or canting the vessel sufficiently to allow the escape of a large volume of air from the open bottom, thereby producing a greater state of agitation and more quickly effecting the desired result.

In small hand-operated aerators of this description the valve and its operation-rod may be dispensed with by tilting vessel when drawing from milk or other liquids, thereby overcoming vacuum. These aerating-vessels may be of any desired size, and for greater convenience in packing for shipment may be of flaring form from bottom to top, in order that they may be packed one partially inclosed in the other.

Having thus described my invention, what I claim as new, and desire to secure by Letters Patent, is—

1. The aerator comprising the inverted vessel provided with air-vents at its upper portion and with a handle, a valve normally closing one of said vents on the under side, said valve having a weighted arm or counter-balance, and a vertical rod attached to said arm and projecting below the lower edge of the vessel, substantially as and for the purpose specified.

2. The aerator comprising the vessel open at its lower end and having air-vents and a handle at its upper portion, one of said vents being larger than the others, the valve normally closing said larger vent-aperture and having a weighted arm or counter-balance, a vertical rod attached to said arm and projecting below the lower edge of the vessel, and a weight-ring incasing the upper portion of said vessel, substantially as specified.

In testimony whereof I affix my signature in presence of two witnesses.

WILLIAM GARRETT.

Witnesses:
    D. E. K. STEWART,
    CHAS. Z. VIZARD.